US00RE33986E

United States Patent [19]

Mosier

[11] E Patent Number: Re. 33,986

[45] Reissued Date of Patent: Jul. 7, 1992

[54] METHOD OF MANUFACTURING FIRE RETARDANT POLYSTYRENE INSULATING BOARD

[76] Inventor: Benjamin Mosier, 5139 S. Braeswood, Houston, Tex. 77096

[21] Appl. No.: 173,937

[22] Filed: Mar. 28, 1988

Related U.S. Patent Documents

Reissue of:

[64] Patent No.: 4,596,682
Issued: Jun. 24, 1989
Appl. No.: 609,482
Filed: May 11, 1984

[51] Int. Cl.[5] ..... B29C 35/12

[52] U.S. Cl. ..... 264/26; 264/45.3; 264/46.5; 264/51; 264/101; 264/109; 264/DIG. 2; 264/DIG. 7

[58] Field of Search ..... 264/26, 45.3, 46.5, 264/51, 101, 109, DIG. 2, DIG. 7, 122, 128

[56] References Cited

U.S. PATENT DOCUMENTS

| | | | |
|---|---|---|---|
| 2,958,905 | 11/1960 | Newberg et al. | 264/51 |
| 3,251,916 | 5/1966 | Newnham et al. | 264/128 |
| 3,345,442 | 10/1967 | Oxel | 264/51 |
| 3,577,363 | 5/1971 | Klug | 521/59 |
| 3,640,787 | 2/1972 | Heller | 156/77 |
| 3,661,810 | 5/1972 | Gahmig | 521/57 |
| 4,079,170 | 3/1978 | Cluff | 428/484 |
| 4,243,717 | 1/1981 | Gahmig | 428/402 |
| 4,256,803 | 3/1981 | Savey et al. | 428/315 |
| 4,369,227 | 1/1983 | Hahn et al. | 428/407 |

FOREIGN PATENT DOCUMENTS 1601013 10/1981 United Kingdom .

*Primary Examiner*—Jeffery Thurlow
*Attorney, Agent, or Firm*—Tilton, Fallon Lungmus & Chestnut

[57] ABSTRACT

Fire retardant polystyrene insulating material is manufactured from expandable polystyrene beads in admixture with a phenol-formaldehyde or melamine-formaldehyde resin in resole form, the resin containing a blowing agent and a surfactant. The insulating material is formed from the bead-resin mix by applying dielectric heating to foam the resin, expand the beads, and cure the foamed resin to a closed cell structure.

5 Claims, 2 Drawing Sheets

METHOD OF MANUFACTURING FIRE RETARDANT POLYSTYRENE INSULATING BOARD

Matter enclosed in heavy brackets [ ] appears in the original patent but forms no part of this reissue specification; matter printed in italics indicates the additions made by reissue.

FIELD OF INVENTION, BACKGROUND AND PRIOR ART

The field of the invention relates to expanded polystyrene insulation material, and more particularly to insulation material produced from admixtures of expandable polystyrene beads with binders or fillers.

Polystyrene is produced in an expandable granular form referred to as polystyrene "beads". The beads have a closed cellular structure and contain an expanding agent such as pentane. The beads may be formed into integrated bodies, such as sheets or slabs, by a molding process in which steam and heat are applied to cause the beads to soften, expand, and integrate. In most applications, the beads are subjected to a pre-expansion before being formed into the molded bodies, the beads being only partially expanded during the pre-treatment. Polystyrene insulating board as presently produced from such beads usually does not contain any additional binders or fillers. However, the patent literature contains some descriptions of such composites. See, for example, U.S. Pat. Nos. 3,151,604; 3,251,916; and 4,079,170.

In the process described in U.S. Pat. No. 3,151,604, pre-expanded polystyrene beads are combined with a thermol plastic polymeric bonding agent that is adapted to flow at a temperature lower than the expansion temperature range of the beads. This mixture is mechanically preformed at a temperature at which the thermoplastic is flowable but below a temperature at which the beads expand. Thereafter, the preformed mass is subjected to heat to expand the beads.

The U.S. Pat. No. 3,251,916 discloses the formation of composite bodies from expanded polystyrene and a polyurethane binder. Other disclosed bonding agents include drying oils, varnishes, and rubber latex gels, which are to be used together with the polyurethane. The polystyrene beads are expanded before being mixed with the binder. U.S. Pat. No. 4,079,170 describes the impregnation of a pre-formed sheet of expanded polystyrene with a wax composition, liquified wax being forced into the sheet under pressure and hardened by cooling.

One of the known disadvantages of expanded polystyrene insulation is that it is a flammable material which can contribute to fire spreading. The incorporation of fire retardant chemical has been proposed, but such chemicals increase the cost of the insulating material. Further, the incorporation of fire retardant chemicals may interfere with the self-bonding of the polystyrene beads during the manufacture of the board, thereby reducing the mechanical strength of the insulation and increasing its friability. Heretofore, no method has been proposed whereby the fire resistance of polystyrene bead insulation can be appreciably increased at minimal additional cost, and with substantial improvement in other desirable properties.

SUMMARY OF INVENTION

This invention relates to a method of manufacturing fire retarding insulation material from expandable polystyrene beads, which contain a heat-activatible expanding agent. For the purpose of in situ encapsulation of the beads, a premix of the polystyrene beads is formed with a heatfoamable thermosetting resin composition. The preferred resins are phenol-formaldehyde and/or melamine-formaldehyde resins. After forming of the premix, it is subjected to heating in enclosed molds to obtain integrated molded bodies composed of resin-encapsulated polystyrene beads. At the time of molding, the beads are in partially expanded condition, and are capable of further expansion on the application of heat. The heating during molding is at temperatures effective for concurrently foaming the resin and expanding the beads.

The resulting molded bodies, which may be in the form of sheets or slabs, have greatly improved fire retardant properties, as determined by the standard flame spread test. The limiting oxgyen index is also improved. Further, although the cost per cubic foot for insulating material of the same density generally corresponds with that of polystyrene beads alone, other important properties are appreciably improved, including a reduction in thermal conductivity, and major improvement with respect to dimensional change under varying temperatures.

THE DRAWINGS

The method of the present invention and the products produced thereby are illustrated in the accompanying drawings, wherein FIG. 1 is a diagramatic perspective view of an apparatus and method for preparing the molding mix;

DETAILED DESCRIPTION

Figure 1:
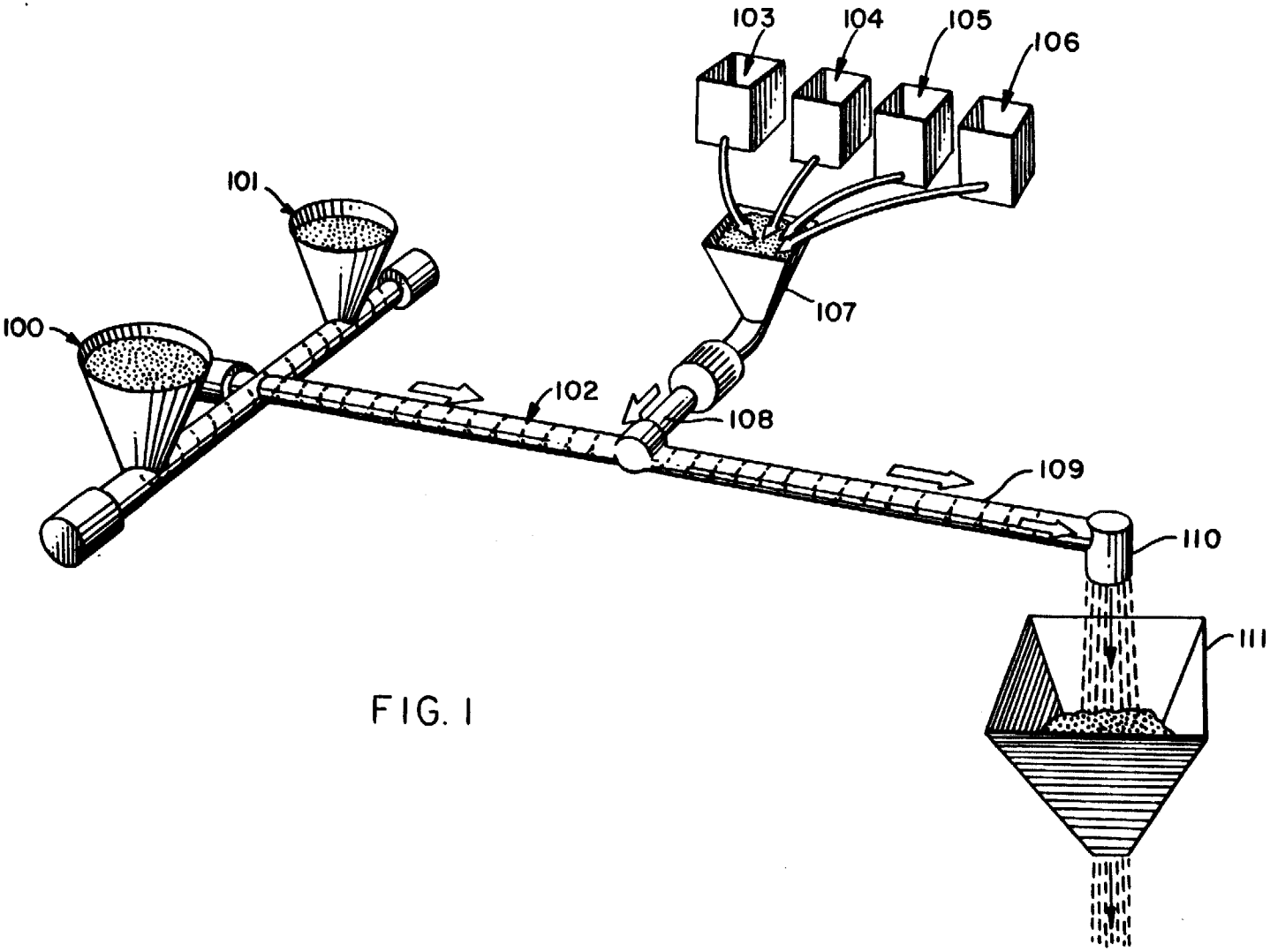

Expandable polystyrene in granular or so-called "bead" form is available commercially. For example, such beads are sold under the trademark name "Styropor" by BASF Wyandotte Corporation, Wyandotte, Mich. The Styropor beads are impregnated with a foaming agent which on application of heat acts to expand the beads. Such expandable polystyrene beads and their method of production and use are further described in patents issued to BASF or a related corporation, including U.S. Pat. Nos. 4,243,717; 4,369,227 and 3,661,810 while various expanding agents may be incorporated in the closed-cell polystyrene beads, such as those commonly used for foaming plastic resins, the commercial foaming agent is commonly pentane.

As sold, the unexpanded polystyrene beads are capable on the application of heat of providing a volumetric expansion of 20 to 25-fold. The expanding process, as described in the cited references, involves the use of direct steam heating. Typically, the beads are subjected to a pre-expansion in a mixer-type apparatus into which the steam is introduced, the extent of the expansion being controlled so that the resulting pre-expanded beads are still capable of further expansion. For the purpose of the present invention, the styrene beads are used in a form wherein they expand by heat, but are preferably in the partially expanded form now employed for the molding of insulating material. For example, the unexpanded styrene beads as supplied by the manufacturer may be expanded by from 50 to 90% of their total expansion volume before being formed into the molding mix of the present invention. The beads preferably should be capable of a volumetric expansion of at least from 10 to 50% with reference to their volume as incorporated in the molding mix.

The pre-expanded beads may range in diameter from about 1 to 5 millimeters (mm). Preferably an admixture of large and small beads are used, such as from 10 to 30 parts by weight of small beads of 1 to 2 mm per 100 parts of large beads of from 3 to 5 mm.

The other primary ingredient of the fire retarding insulation material of this invention is a heat-foamable thermosetting resin composition. The resin component is preferably a phenol-formaldehyde resin, a melamine-formaldehyde resin, or mixtures thereof, such as 4 parts by weight of the phenolic resin to one part of the melamine resin. These resins are preferably employed in the form of Resoles, that is, as A-stage resins. The Resoles are water soluble and contain a predominance of methylol groups. However, Resolites or B-stage resins can also be employed which are capable of being cured to the final C-stage Resite polymers. Such phenolic and melamine resins are available commercially in the form of Resoles. For example, phenol-formaldehyde Resoles are sold by Clark Chemical Corp., Blue Island, Ill., by Ashland Chemical Company, Columbus, Ohio, and others. Suitable melamine-formaldehyde resins in the form of Resoles are available commercially from the Melamine Division of Ashland Chemical Company. The volume of resin to pre-expanded beads in the molding mix may range from 5 to 75 parts resin to 100 parts beads. Preferred proportions are from 10 to 50 parts of the resin per 100 parts by volume of the partially expanded beads.

The resin composition in addition to the resin as described above preferably also includes a blowing or foaming agent, a catalyst, and a surfactant. For example, the blowing agent may be trichlorofluoromethane (Freon 11), trichlorotrifluoromethane (Freon 113), n-pentane, or methylene chloride; the catalyst may be phenolsulfonic acid or toluene sulfonic acid; and the surfactant may be sorbitan monooleate with 20 moles ethylene oxide, sorbitan monolaurate with 20 moles ethylene oxide, or comparable surfactant.

Examples of preferred thermosetting resin compositions are as follows:

| Formula A | |
|---|---|
| Ingredients | Wt. % |
| Phenolic resin (Resole) | 80 |
| Sorbitan monooleate with 20 moles of ethylene oxide | 4 |
| Freon 11 | 8 |
| Phenol sulfonic acid (65% w/w as PSA) | 8 |

| Formula B | |
|---|---|
| Ingredients | Wt. % |
| Melamine formaldehyde resin | 82 |
| Sorbitan monolaurate with 20 moles of ethylene oxide | 2.5 |
| Freon 11 | 5.8 |
| Freon 113 | 2.5 |
| Phenolsulfonic acid (65% w/w as PSA) | 7.2 |

The thermosetting resin will comprise the major ingredient of the resin composition. In combining the resin composition with the polystyrene beads, the resin content can range from 10 to 100 parts by weight of resin per 100 parts of the polystyrene beads. A preferred range is from 20 to 60 parts of the resin per 100 parts by weight of the beads.

Usually it would be preferable to preform the resin composition, combining the resin, surfactant, blowing agent and catalyst, and then combining this composition with the polystyrene beads. Since the resin composition will be in liquid form, it may be admixed with the beads in a mixer apparatus, such as paddle mixers, or screw conveyors providing a mixing-kneading action. The resulting premix of the beads and resin provides a moldable mixture, which can be formed into sheets, slabs, and the like for use as insulating material. The molding composition is preferably used as prepared in a continuous operation, but the molding composition can be held at room temperature for 30 to 60 minutes if necessary, prior to molding.

In the molding operation, the molding composition is charged to molds, such as rectalinear molds, which are provided with heating means. After the molds are closed and locked to withstand pressure, heat is applied, such as by dielectric heating means. In general, the temperature employed in the molding operation should be sufficient to foam the resin composition, expand the beads, and cure the resin. Temperatures of from 100° to 150° F. will usually be sufficient for the molding operation. The molding time will vary with the heating means, but where dielectric heating is employed, molding times of as short as from 10 to 60 seconds. During the molding operation, the resin further polymerizes, reaching the final C-stage of resin polymerization. In the final product, the resin substantially fills the void spaces between the polystyrene beads effectively coating or "encapsulating" the beads, such as the preferred mixture of large and small beads, as described above.

MANUFACTURING EXAMPLES

Referring now to the drawings, an apparatus for preparing a molding mix is shown in FIG. 1. As there shown, two sizes of polystyrene beads are contained in feed hoppers *100 and 101*. The beads have been pre-expanded by contact with heat, being expanded from their original volume by about 2000% and being capable of further expansion of about 25%. For example, the small beads *in hopper 100* may have an average size of about 1–2 mm, and the large beads *in hopper 101* an average size of about 4–5 mm. The feeding of the beads can be proportioned so that from about 1 part of the small beads are combined with 4 parts by volume of the large beads. As illustrated in FIG. 1, the intermixed beads are fed by means of a screw conveyor *102* to an intermediate section into which there is introduced the resin composition, which has been formed, as illustrated, by intermixing the phenolic or melamine resin with a surfactant, blowing agent, and catalyst *respectively in bins 103, 104, 105 and 106 which discharge to hopper 107.* For example, Formulas A and B as set out above can be used. The resin composition is fed into the beads at a rate providing on the basis of the resin content of the composition 20–30 parts of resin per 70–80 parts by volume of the mixed beads. After the introduction of the resin, the beads and resin are further kneaded and *transferred through tube 108 to be* mixed by the screw conveyor *109.* The resulting molding composition is discharged *through nozzle 100* into a storage bin.

Figure 2:
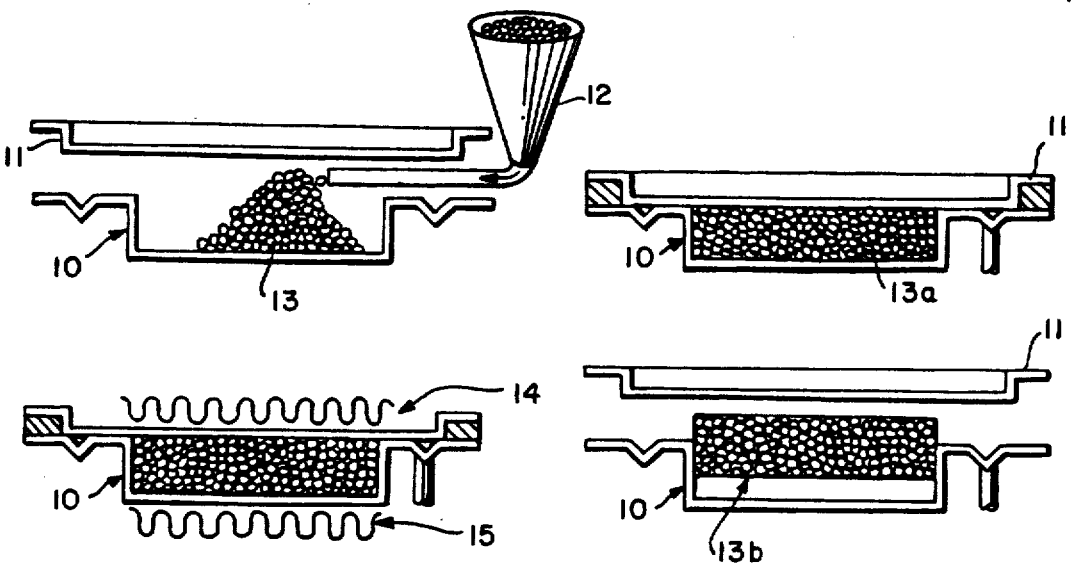
FIG. 2 is a diagramatic sequential illustration of the molding operation.
Figure 3:
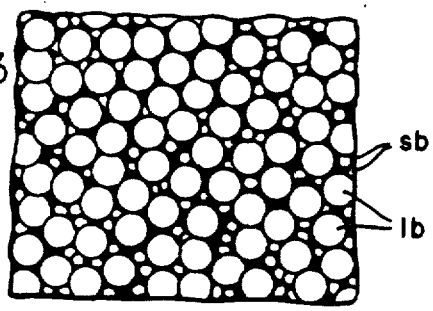
FIG. 3 is an enlarged sectional view of the insulating material showing the resin encapsulation of the polystyrene beads.

FIG. 2 illustrates a molding operation sequence. The molding mixture *13* from the storage bin is supplied to a mold *10* through a suitable feed chute *12.* It is spread and leveled in the mold *at 13a,* and then the mold is closed *by cover 11* and clamped *by clamps 14, 15.* Heat is applied such as by means of dielectric heating elements. The frequencies used may range from 25 to 30 megahertz (mhz) at a power level of 1 to 5 kilowatts (kw). The internal temperature of the mold mixture during the molding operation can range from about 125° to 150° F. On completion of the molding operation, the mold is opened, and the molded slab *13b* of insulation board is removed. The cross-sectional appearance of the molded slab is illustrated in the enlarged view of FIG. 3. The large white circles *1b* represent the large beads and the small white circles *sb* the small beads. The dark material surrounding and enclosing the beads is the polymerized and cured resin.

Figure 4:
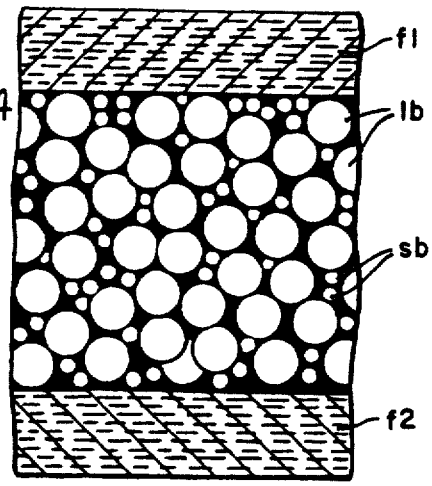
FIG. 4 is a cross-sectional view of a composite of the insulation material of this invention bonded to facing sheets.

During the molding operation, if desired, various substrates may be adhesively attached to the upper and/or lower surfaces of the molded slabs. Such a composite is illustrated in a cross-section of FIG. 4. For example, the upper layer *f1* may comprise wood fiber board impregnated with asphalt and the lower facing layer *f2* pressed wood. A wide variety of other facing materials can be used, including aluminum foil, wood, sheet rock, steel, cardboard, fabric, fiberboard, fiberglass, etc.

EXPERIMENTAL EXAMPLES

For the purpose of testing the properties of insulation material prepared by the method of this invention, samples were prepared from a phenol-formaldehyde resin and pre-expanded polystyrene beads as follows: (1) 25% resin with 75% beads, and (2) 35% resin with 65% beads. These percentages are by volume and relate to the mix prior to molding. A resin composition like Formula A above was mixed with partially expanded polystyrene beads comprising about 80% by volume of 4–5 mm beads with 20% of 1–2 mm beads, which were capable of being expanded 20–25%. The molding mixture was charged to molds equipped with dielectric heating means, and molded therein into rectalinear blocks, using a molding temperature of approximately 125°–150° F. Specimens from each of the mold mixtures were then tested for physical properties. The results are summarized below in Table A, which includes a comparison with a standard commercial polystyrene board. The phenolic resin used was a resole resin supplied by Clark Chemical Company as resin CR-3588 (70–80% solids; 1.23–1.26 specific gravity; 1000–2000 cps viscosity, 7–8 pH; 70–90 seconds Stroke cure; 200–300 seconds gel; and 9–12% water).

TABLE A

| | Polystyrene | IR Resin Encap PS (25%) | IR Resin Encap PS (35%) |
|---|---|---|---|
| Density (#/ft$^3$) | 1.25 | 1.50 | 1.75 |
| Thermal Conductivity | | | |
| BTU/hr/°F./in/ft$^2$ | 0.23 | 0.20 | 0.19 |
| W/m °C. | 0.0332 | 0.0288 | 0.0274 |
| Coefficient Linear Expansion ($\times 10^{-6}$) | 80 | 20 | 25 |
| Closed Cell Content % | 90–95 | 90–95 | 90–95 |
| Dimensional Stability Shrinkage (at 80° C.) | 0.5 | <0.5 | <0.5 |
| Limiting Oxygen Index (LOI) | 17 | 22 | 25 |
| Compressive Strength (#/in$^2$) | 25 | 27 | 29 |
| Thermal Stability (Flame Spread ASTM-E-1621) | 20–25 | 10–15 | <10 |
| Smoke Density (NBS Chamber %) | >10 | <10 | >10 |
| Estimated Cost (per cubic foot) | 3.44 | 3.52 | 3.59 |

I claim:

1. The method of manufacturing fire retarding insulation material from expandable polystyrene beads containing a heat-activatable expanding agent, *said beads being capable of a volumetric expansion of at least 10%,* comprising:

(a) preparing a moldable mixture of said beads with a heat-foamable thermosetting resin composition, the resin component of said composition being selected from the class consisting of phenol-formaldehyde and melamine-formaldehyde resins, said resin being in resole form and containing a blowing agent and a surfactant, from 5 to 75 parts by volume of said resin being present per 100 parts of said polystyrene beads in said mix; and (b) applying dielectric heating to portions of said moldable mixture in enclosed molds to obtain integrated molded bodies composed of resin-encapsulated polystyrene beads, said dielectric heating being effective for rapidly foaming said resin, expanding said beads, and curing the foamed resin to a predominately closed cell structure.

2. The method of claim 1 in which said resin is a phenol-formaldehyde resin, and is employed in an amount of from 10 to 50 parts by volume per 100 parts of said polystyrene beads.

3. The method of claim 1 in which said resin is a melamine-formaldehyde resin, and is employed in an amount of from 10 to 50 parts by volume per 100 parts of said polystyrene beads.

4. The method of claim 1 in which said dielectric heating is at a temperature of about 100° to 150° F. and is completed in 10 to 50 seconds.

*5. The method of claim 1 in which said expanding agent is pentane.*

* * * * *

UNITED STATES PATENT AND TRADEMARK OFFICE

CERTIFICATE OF CORRECTION

PATENT NO. : RE 33,986

DATED : July 7, 1992

INVENTOR(S) : Benjamin Mosier

It is certified that error appears in the above-identified patent and that said Letters Patent is hereby corrected as shown below:

Title page, under "Related U.S. Patent Documents", the issue date of "Jun. 24, 1989, should read --Jun. 24, 1986--.

Signed and Sealed this

Twenty-first Day of September, 1993

Bruce Lehman

*Attest:*

BRUCE LEHMAN

*Attesting Officer*

*Commissioner of Patents and Trademarks*